United States Patent
LeClair et al.

(10) Patent No.: US 11,647,015 B2
(45) Date of Patent: May 9, 2023

(54) FACTOR AUTHENTICATION FOR ROBOTIC PROCESSES

(71) Applicant: UiPath, Inc., New York, NY (US)

(72) Inventors: Justin LeClair, Lexington, MA (US); Joseph Lasher, Long Island City, NY (US)

(73) Assignee: UiPath, Inc., New York, NY (US)

(*) Notice: Subject to any disclaimer, the term of this patent is extended or adjusted under 35 U.S.C. 154(b) by 59 days.

(21) Appl. No.: 16/944,044

(22) Filed: Jul. 30, 2020

(65) Prior Publication Data
US 2022/0038445 A1 Feb. 3, 2022

(51) Int. Cl.
*H04L 9/40* (2022.01)
*G06F 16/955* (2019.01)

(52) U.S. Cl.
CPC .......... *H04L 63/083* (2013.01); *G06F 16/955* (2019.01); *H04L 63/0807* (2013.01); *H04L 2463/082* (2013.01)

(58) Field of Classification Search
CPC ............... H04L 63/083; H04L 63/0807; H04L 2463/082; H04L 9/3226; H04L 9/3213; G06F 16/955; H04W 12/069
See application file for complete search history.

(56) References Cited

U.S. PATENT DOCUMENTS

| 8,578,454 | B2 | 11/2013 | Grim |
| 10,437,984 | B2 | 10/2019 | Votaw et al. |
| 2009/0259588 | A1 | 10/2009 | Lindsay |
| 2010/0064357 | A1 | 3/2010 | Baird et al. |
| 2010/0115594 | A1 | 5/2010 | Paya et al. |
| 2013/0244614 | A1* | 9/2013 | Santamaria ......... H04W 12/069 455/411 |
| 2015/0180849 | A1 | 6/2015 | Nesic |
| 2015/0195369 | A1 | 7/2015 | Lowry et al. |
| 2016/0092666 | A1* | 3/2016 | Padilla ................ G06F 21/6245 726/27 |
| 2016/0140550 | A1* | 5/2016 | Keys ..................... H04W 12/06 726/9 |

(Continued)

FOREIGN PATENT DOCUMENTS

| KR | 10-2007-0111660 A | 11/2007 |
| KR | 1020160005111 A | 1/2016 |

OTHER PUBLICATIONS

Aleksandr Ometov et al., "Challenges of Multi-Factor Authentication for Securing Advanced IoT Applications," 2019, pp. 82-88. (Year: 2019).*

(Continued)

*Primary Examiner* — Luu T Pham
*Assistant Examiner* — Canh Le
(74) *Attorney, Agent, or Firm* — Volpe Koenig (57) ABSTRACT

Disclosed herein is a computing device that includes a memory and a processor. The memory store processor executable instructions for an authentication system. The processor is coupled to the memory. The processor executes the authentication system to cause the computing device to generate a credential asset, which includes a unique name. The authentication system, also, fetches tokens for the credential asset using the unique name, calls a notification for each of the tokens, polls for a code of the credential asset, and utilizes the code for an authentication to run a job.

18 Claims, 7 Drawing Sheets

(56) References Cited

U.S. PATENT DOCUMENTS

| | | | |
|---|---|---|---|
| 2016/0164866 A1* | 6/2016 | Oberheide | H04L 63/0853 |
| | | | 726/1 |
| 2017/0078270 A1 | 3/2017 | Tang | |
| 2018/0278746 A1* | 9/2018 | Yacov | H04L 63/0869 |
| 2018/0345489 A1 | 12/2018 | Allen, IV et al. | |
| 2019/0327236 A1 | 10/2019 | Ahuji et al. | |
| 2020/0013500 A1* | 1/2020 | Mora | G16H 40/20 |
| 2020/0067923 A1 | 2/2020 | Dasari et al. | |
| 2020/0180148 A1* | 6/2020 | S Nanal | G05B 19/0423 |
| 2020/0180155 A1 | 6/2020 | Hall | |
| 2020/0310844 A1* | 10/2020 | Dennis | G06F 9/45512 |
| 2020/0348964 A1* | 11/2020 | Anand | G06F 9/5005 |
| 2021/0096940 A1* | 4/2021 | Fujishima | G06F 11/0775 |
| 2021/0109767 A1* | 4/2021 | Cohen | G06F 21/44 |
| 2021/0124462 A1* | 4/2021 | Vakil | G06F 9/451 |
| 2021/0314339 A1* | 10/2021 | Tsarfati | G06F 21/577 |
| 2022/0107622 A1* | 4/2022 | Monakova | G05B 19/4155 |

OTHER PUBLICATIONS

Tien Pham et al., "Multi-factor EEG-based User Authentication," 2014, pp. 4029-4034. (Year: 2014).*
Reveal Group, "2-Factor Authentication," Blue Prism, Dec. 31, 2019, pp. 1-5.
International Search Report and Written Opinion; PCT/US2021/043711; dated Nov. 10, 2021; pp. 1-7.
European Search Report for Application No. EP 21 80 1400 dated Nov. 29, 2022.

\* cited by examiner

FACTOR AUTHENTICATION FOR ROBOTIC PROCESSES

BACKGROUND

Online platforms that desire to prevent unauthorized access employ security when permitting user access thereto. An example of security employed by an online platform is user verification. Generally, user verification includes when a user submits credentials (e.g., a correct user name and password combination) to gain access to the online platform.

Multi-factor authentication is a security enhancement to user verification. Multi-factor authentication requires at least two pieces of 'evidence' when logging into the online platform. For instance, credentials can be considered a first factor that are combined with one or more additional factors, such as something a user has (e.g., a smart card or authentication code) and/or something about the user (e.g., a fingerprint). Yet, with respect to robotic processes (whether unattended or attended), the multi-factor authentication poses problems.

For instance, when a robotic process attempts to log-in to an online platform using multi-factor authentication with user verification, the robotic process can experience an error or failure because there is no way for the robotic processes to get the one or more additional factors to complete the multi-factor authentication. Thus, it is desirable to improve multi-factor authentication in such a way as to enable robotic processes to navigate multi-factor authentication.

SUMMARY

According to one or more embodiments, a computing device is provided. The computing device includes a memory and a processor. The memory store processor executable instructions for an authentication system. The processor is coupled to the memory. The processor executes the authentication system to cause the computing device to generate a credential asset, which includes a unique name. The authentication system, also, fetches tokens for the credential asset using the unique name, calls a notification for each of the tokens, polls for a code of the credential asset, and utilizes the code for an authentication to run a job.

According to one or more embodiments, the computing device embodiment above can be implemented as a method, an apparatus, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

Disclosed herein is an authentication system according to one or more embodiments. The authentication system includes software and/or hardware that performs functions of at least a part of an authentication procedure. The authentication system provides a specific configuring and tooling robotic process automation method for accessing online platforms, where the authentication system can be a combination of hardware and software (e.g., processor executable code that is necessarily rooted in the hardware). In this regard, the configuring and tooling robotic process automation method alerts a user (e.g., immediately) that a robotic process is in need of one or more additional factors of the multi-factor authentication and provides the robotic process with those one or more additional factors. Thus, the configuring and tooling robotic process automation method of the authentication system involves a multi-step data manipulation of configuration settings and screens (and/or software windows) of one or more devices and/or databases in connection with the robotic process navigating multi-factor authentication implemented by online platforms.

In this regard and in operation, the authentication system generates a credential asset including at least a unique name. The unique name further enables fetching of one or more tokens for the credential asset. Thus, when the authentication system calls a notification for the one or more tokens, the authentication system can further poll for a code of the credential asset and utilize the code for a multi-factor authentication to run any job. The technical effects and benefits of the authentication system include improving multi-factor authentication by connecting log-in attempts, credential assets, and codes using tokens to authenticate (e.g., automatically) robotic processes. The technical effects and benefits of the authentication system also include allowing selection and association of credential assets for devices, so that the devices receive notifications for multi-factor authentication with respect to robotic processes.

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
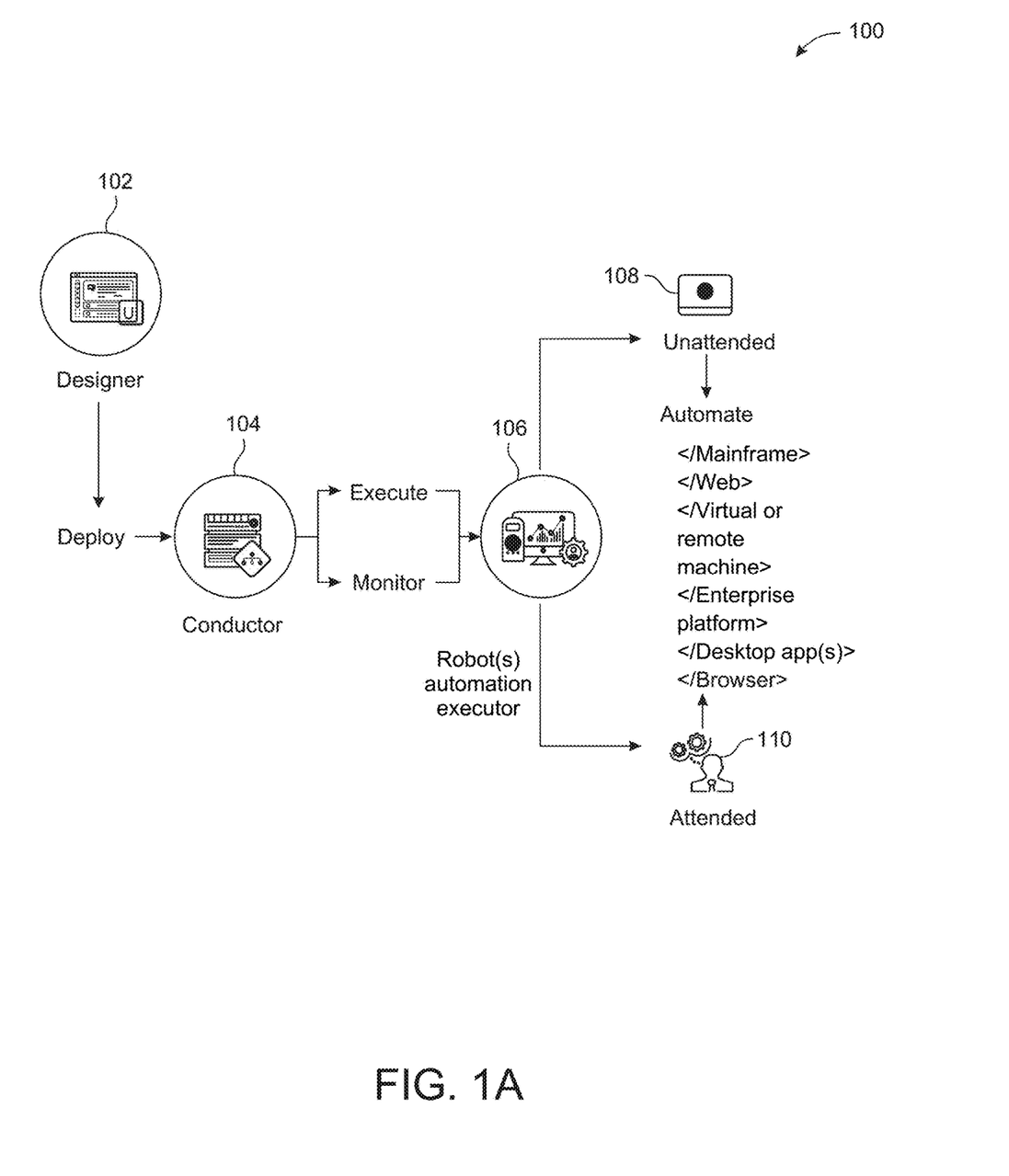
FIG. 1A is an illustration of robotic process automation (RPA) development, design, operation, or execution according to one or more embodiments.

FIG. 1A is an illustration of robotic process automation (RPA) development, design, operation, or execution 100. Designer 102, sometimes referenced as a studio, development, or online platform including one or more engines (e.g., an authentication system), development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing log-ins, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, online platform, desktop app(s), browser, or the like client, application, or program. Conductor 104 may act as a central or semi-central point to instruct or command a plurality of robots to automate a computing platform (e.g., an online platform).

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
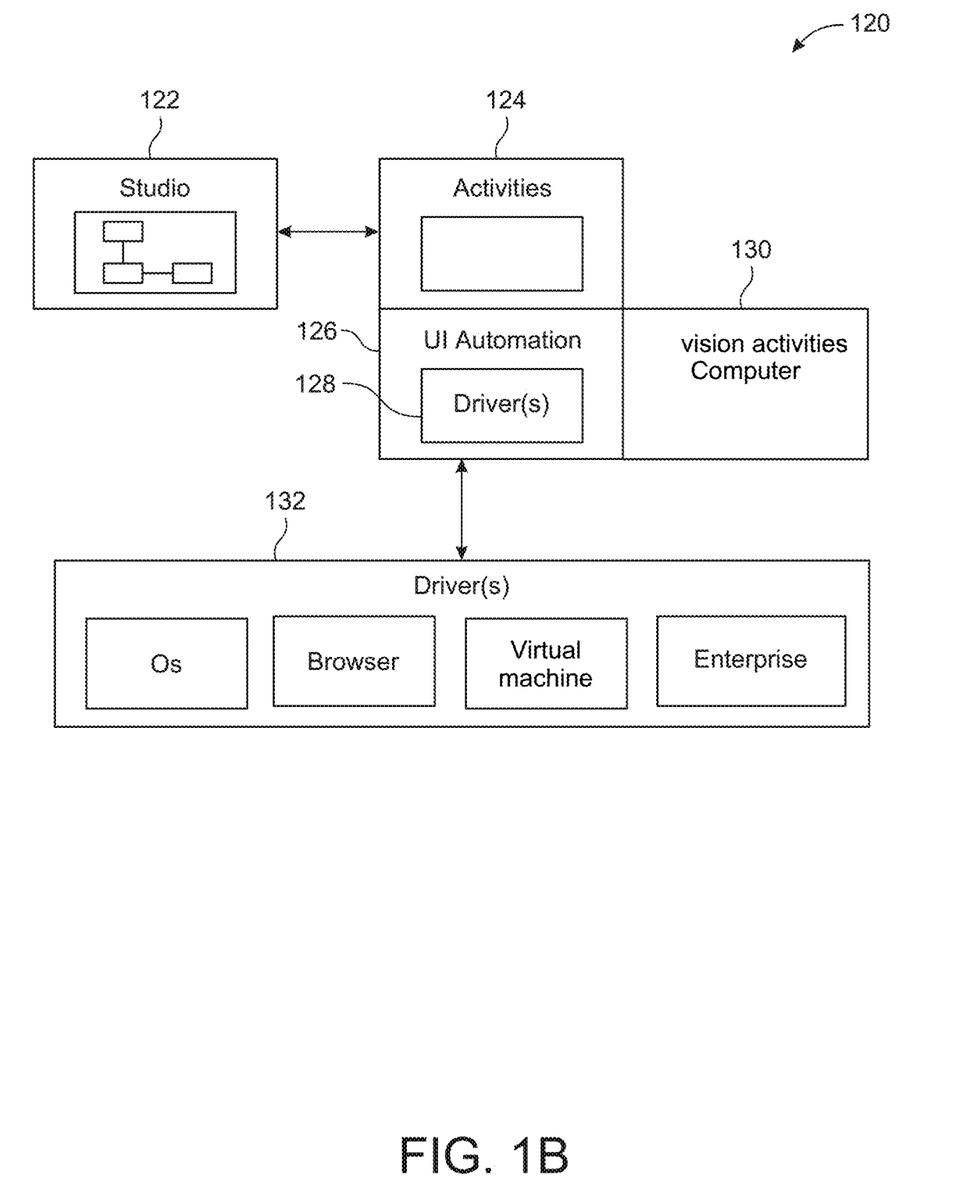
FIG. 1B is another illustration of RPA development, design, operation, or execution according to one or more embodiments.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130 (e.g., an authentication system). Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
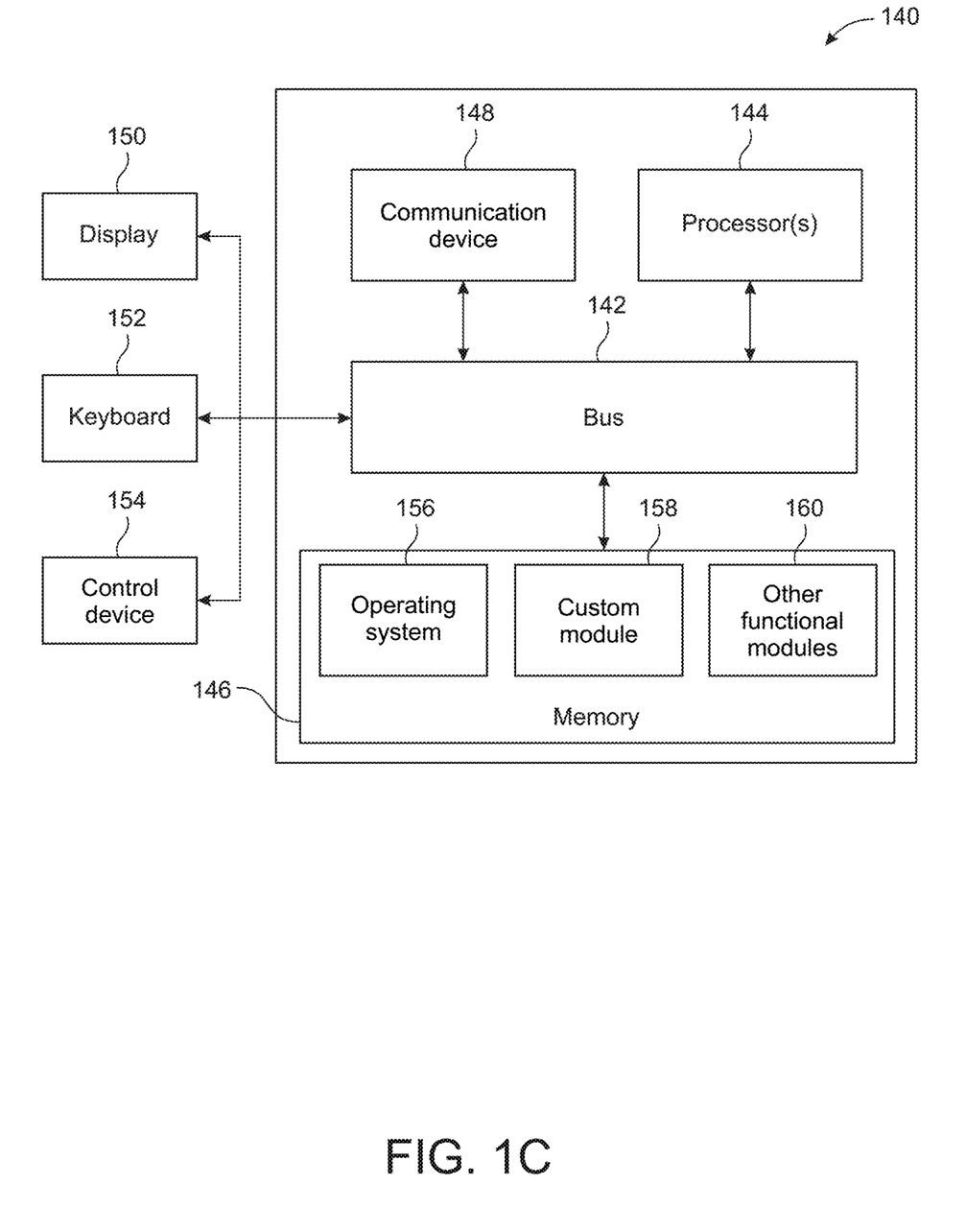
FIG. 1C is an illustration of a computing system or environment according to one or more embodiments.

FIG. 1C is an illustration of a computing system or environment 140 (e.g., hardware supporting an online platform and/or an authentication system) that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions (e.g., processor executable instructions of an authentication system), commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality. For example, the authentication system can be implemented in one or more of the modules 158 and 160 to provide a specific configuring and tooling robotic process automation method to the computing system or environment 140.

Computing system or environment 140 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Figure 2:
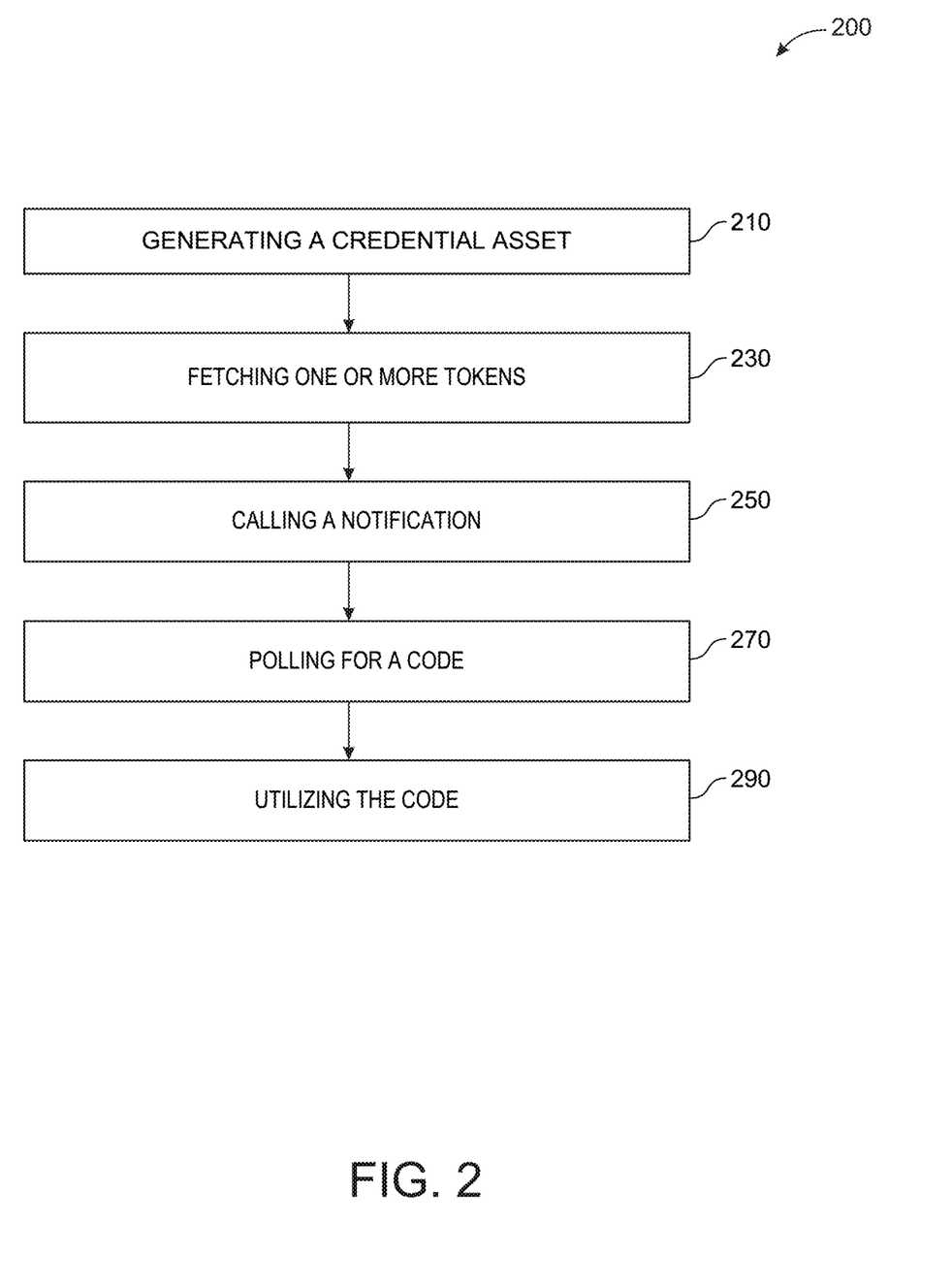
FIG. 2 is a block diagram illustrating a process flow executed by one or more processor within an authentication system according to one or more embodiments.

Turning now to FIG. 2, a block diagram illustrating a process flow 200 executed by one or more processor within an authentication system according to one or more embodiments. More particularly, the process flow 200 is an example implementation of a method for authentication operations by the authentication system. Generally, the authentication system (e.g., software and/or hardware that performs functions of at least a part of an authentication procedure) executes with respect to robotic processes of a computing device logging-in to an online platform utilizing multi-factor authentication. In accordance with one or more embodiments, the authentication operations and the authentication system are implemented by hardware and/or processor executable instructions, computer code, and/or programming languages. Further, in accordance with one or more embodiments, the authentication operations and the authentication system can be part of a multi-factor authentication framework of an online platform.

The process flow 200 begins at block 210, where the authentication system generates a credential asset including at least a unique name. The credential asset includes digital-based credentials (to obtain some service), such as a proof of qualification, competence, and/or clearance that are attached to a user or device. In this regard, the credential asset can prove something about the user or device and can contain names (e.g., the unique name), birth information, manufacturing information, identification information, and/or biometric information. The credential asset can be generated in response to a robotic process executing a job requiring authentication, where the robotic process is being executed on the computing device. For instance, the robotic process executing on the computing device connects to the online platform and attempts to log-in thereto using the unique name (of the robotic process or the job). The authentication system of the online platform, in response to the connection, generates and stores the credential asset (e.g., with respect to user input from a user device).

At block 230, the authentication system fetches (e.g., retrieves from a memory) one or more tokens for the credential asset using the unique name. That is, the authentication system uses the unique name of the robotic process or the job to fetch/get all tokens associated with that unique name. A token fetched by the authentication system includes any object (stored in software or coded hardware) that represents a right to perform an operation. Examples of the one or more tokens can include, but are not limited to, push tokens (e.g., a unique key, access handle, or system object representing access control operations), security tokens (e.g., token or cryptographic token), and session tokens (e.g., unique identifier of an interaction session). Tokens can come in one or more types, such as primary or impersonation types, and can include various fields, such as user identifier, group identifier, session identifier, and privilege identifier fields.

At block 250, the authentication system calls a notification for each of the one or more tokens. The notification is a message that can reach any device, anywhere, and at any time (e.g., the user device). An example notification can include a push notification uniform resource locator. The authentication system can send the notification and provide the one or more tokens to the user device. For example, the call can be made to the user device, and the notification can be displayed by the user device.

At block 270, the authentication system polls for a code of the credential asset (e.g., polls the user device). The code can be any alpha-numeric combination. At block 290, the authentication system utilizes the code for an authentication to run a job. In accordance with one or more embodiments, the code can be received and utilized by the authentication system from the user device to update the credential asset in response to the notification. The updated credential asset is then used by the robotic process to log-in to the online platform.

Figure 3:
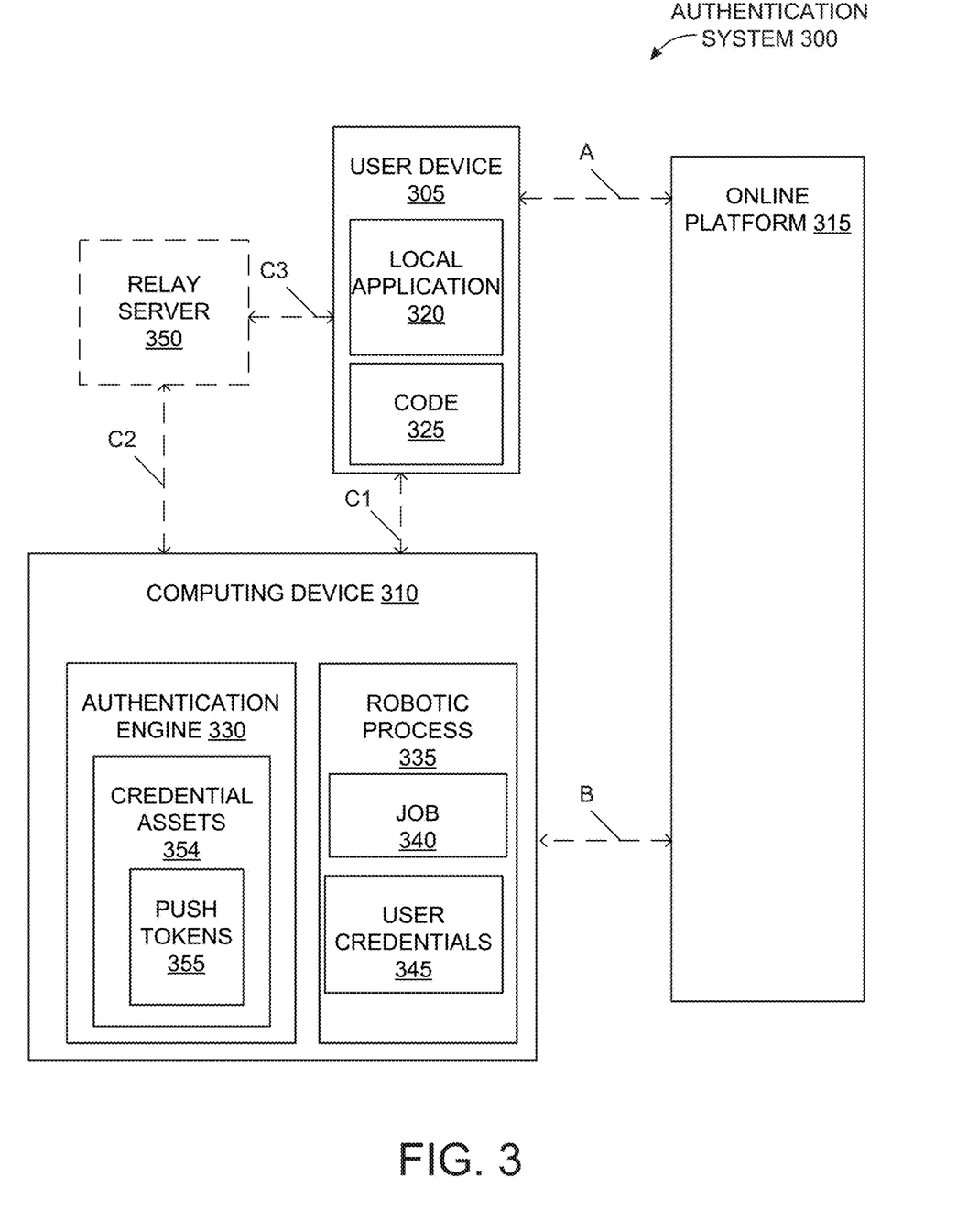
FIG. 3 is an illustration of an authentication system according to one or more embodiments.

Turning now to FIGS. 3-6, components and operations of the authentication system are described according to one or more embodiments. FIG. 3 is an illustration of an authentication system 300 (e.g., software and/or hardware that performs functions of at least a part of an authentication procedure). As shown in FIG. 3, the authentication system 300 includes a user device 305 and a computing device 310 that communicate with an online platform 315 (as shown by the dashed arrows A and B).

The user device 305 is representative of one or more user devices, each including at least a processor, a memory, and a display with a user interface. Examples of the user device 305 include, but are not limited to, a personal computer, a PDA, a cell phone, a tablet computing device, a mobile device, and a smartphone. The user device 305 can execute a local application 320 (e.g., a mobile application) that provides one or more screens on a display of the user device 305 (e.g., the user interface). The local application 320 can receive inputs from a user through the user interface, can receive one or more codes 325 with respect to multi-factor authentication operations, and can communicate with an authentication engine 330.

The computing device 310 is representative of one or more devices supporting one or more robotic processes 335 executing one or more jobs 340. Each computing device 310 includes at least a processor and a memory (and optionally a display with a user interface). Examples of the computing device 310 include, but are not limited to, a personal computer, a tablet computing device, and a desktop device. The robotic process 335 can attempt to log-in to the online platform 315 using user credentials 345. Note that while the authentication engine 330 is shown as local to the computing device 310, the authentication engine 330 can also be, or in the alternative, local to the online platform 315, local to the user device 305, or a stand-alone hardware/software combination that is in communication with the other components of the authentication system 300. Note the user device 305 and the computing device 310 can directly communicate (as shown by dashed arrow C1) and/or can optionally communicate via a relay server 350 (as shown by the dashed arrows C2 and C3; a dashed border of the relay server 350 indicates this component as optional).

The online platform 320 is representative of one or more software-, infrastructure-, platform-based services that provide networks, servers (e.g., the relay server 350), storage services, operating systems, database services, and security services (e.g., the authentication engine 330) to the user device 305 and/or the computing device 310. The authentication engine 330 can operate on more or more processors/ devices/systems of the online platform, such that credential assets 354 are generated, stored, and managed therein. Note that the arrows A, B, C1, C2, and C3 within the authentication system 300 are representative of communications transmitted over wired and/or wireless connections, networks, and the like. Further, while a single block is shown for each item or component of the authentication system 300, that single block is representative of one or more of that item or component.

In accordance with one or more embodiments, the credential asset 354 save data so that the local application 320 and the robotic process 335 can communicate all of the required information to each other. This includes more than just the code 325. For instance, the credential asset 354 can have one or more fields, such as an asset name, a description, a username, and a password.

The asset name can be a name of a two-factor authentication (2FA) asset (e.g., a "PENDING_2FA_ASSET_etc" or something unique that the local application 320 can search for when fetching 2FA assets).

The description can be a field where information of the 2FA transaction is saved. The information can be a string, such as a JSON String, as detailed herein. Further, the information can include a process, a robot, an epoch, a website, an email, and a needsCode. IN accordance with one or more embodiments, the description may have a 250 character limit, so the authentication system 300 ensures to condense this information as a JSON string, comma-delimited string, or something else:

```
JSON:
{
    process: "Demo Process",
    robot: "Job Robot",
    epoch: 1583784275,
    site: "Website",
    email: demo@demo.demo,
    needCode: 1
}
```

The process can be the name of the job 340 that the robotic process 335 is running. The robot can be the name of the robotic process 335 that is running the job 340. The epoch can be an epoch that the robotic process 335 last sent the code 325 at (so the local application 320 can see if too much time has passed). The website can be an email service/website that the robotic process 335 is trying to log-into. The email can be an email/username that the robotic process 335 is trying to log-in with. The needsCode can be a Boolean operator indicating if the robotic process 335 currently needs a code. For instance, if the needsCode is a '1', the robotic process 335 is waiting for the local application 320 to supply the code 325. If the needsCode is a '0', the local application 320 has set the code 325 (e.g., a 2FA Code) to the password field and saved it.

The username of the credential asset 354 is a flexible field that can, in some cases, include the code 325 (e.g., a 2FA Code). The password can be a field that receives the 2FA Code. The robotic process 335 is able to see the 2FA Code in the credential asset 354. Yet, orchestrator users cannot see the 2FA Code in the credential asset 354. In this way, the authentication system 300 provides the technical effect and benefits of preventing snooping by non-authorized users (e.g., the orchestrator users).

Figure 4:
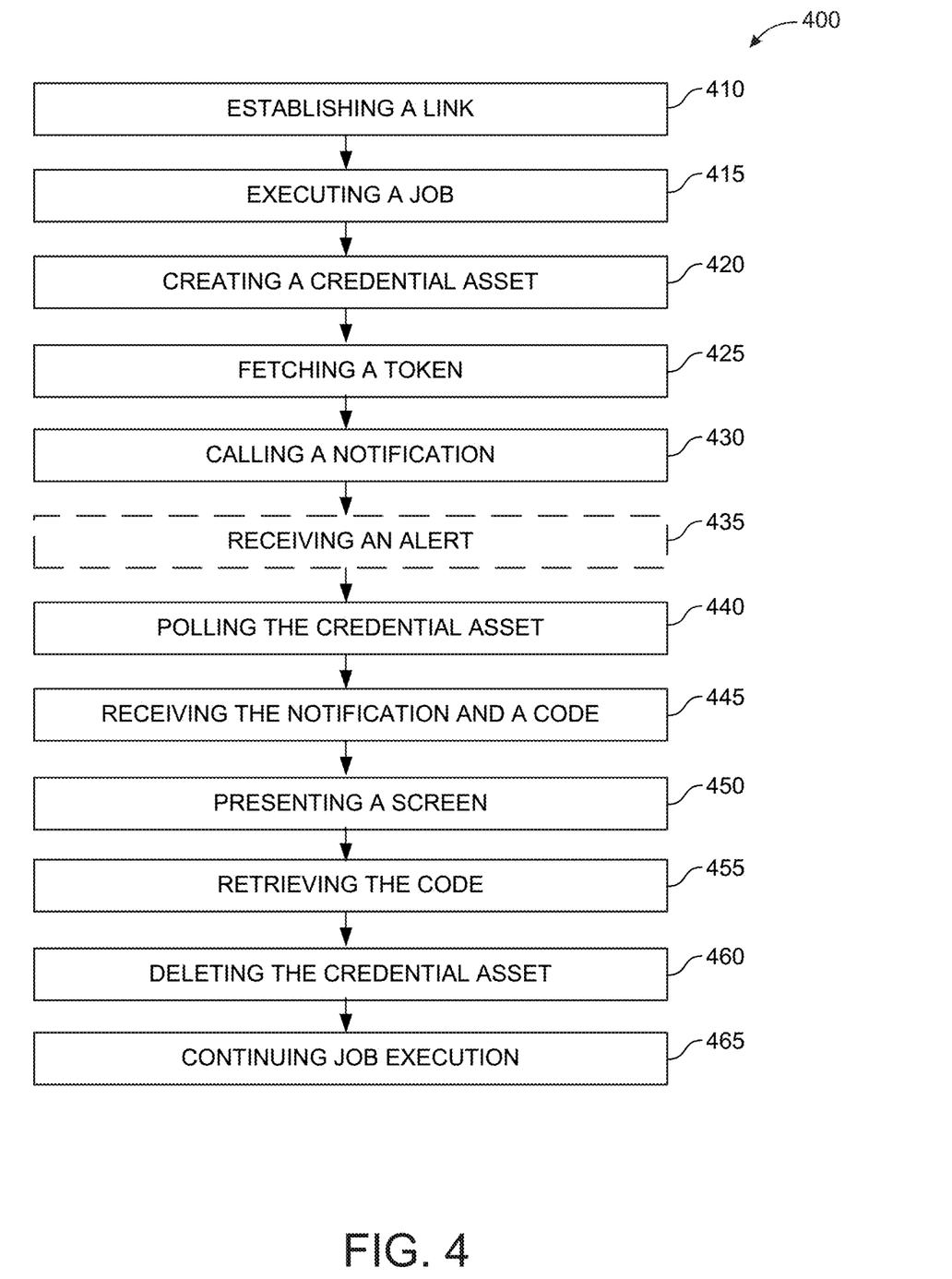
FIG. 4 is a block diagram illustrating a process flow executed by the authentication system of FIG. 3 according to one or more embodiments.

Turning to FIG. 4, a block diagram illustrating a process flow 400 executed by the computing environment 300 of FIG. 3 is shown. Further, FIGS. 5-6 are block diagrams illustrating user interface flows 500 and 600 according to one or more embodiments.

The process flow 400 begins at block 410, where a link is established. The link can be between the local application 320 of the user device 305 and the authentication engine 330 of the online platform 315 (e.g., via the relay server 350). The link enables the authentication system 300 to generate the credential asset 354 according to the user input at the user device 305. The robotic process 335 uses the credential asset 354 to log-in to the online platform 315 (or other external service).

In general, a user operating the user device 305 can cause the creation of an asset that has a push token of the user device 305 therein. The robot process 335 can pull that push token to send a push notification to the user device 305 when the robot process 335 encounters multi-factor authentication (e.g., a two-factor issue using the credential asset 354). For example, within block 410, a push token 355 for each user credential 345 is generated/created and stored within the credential asset 354. The technical effects and benefits of the push token 355 allow for the user on the user device 305 to select which credential assets 354 they want associated with their user device 305, so that they receive 'PushNotifications' requesting/needing two-factor codes for those selected credential assets 354.

Figure 5:
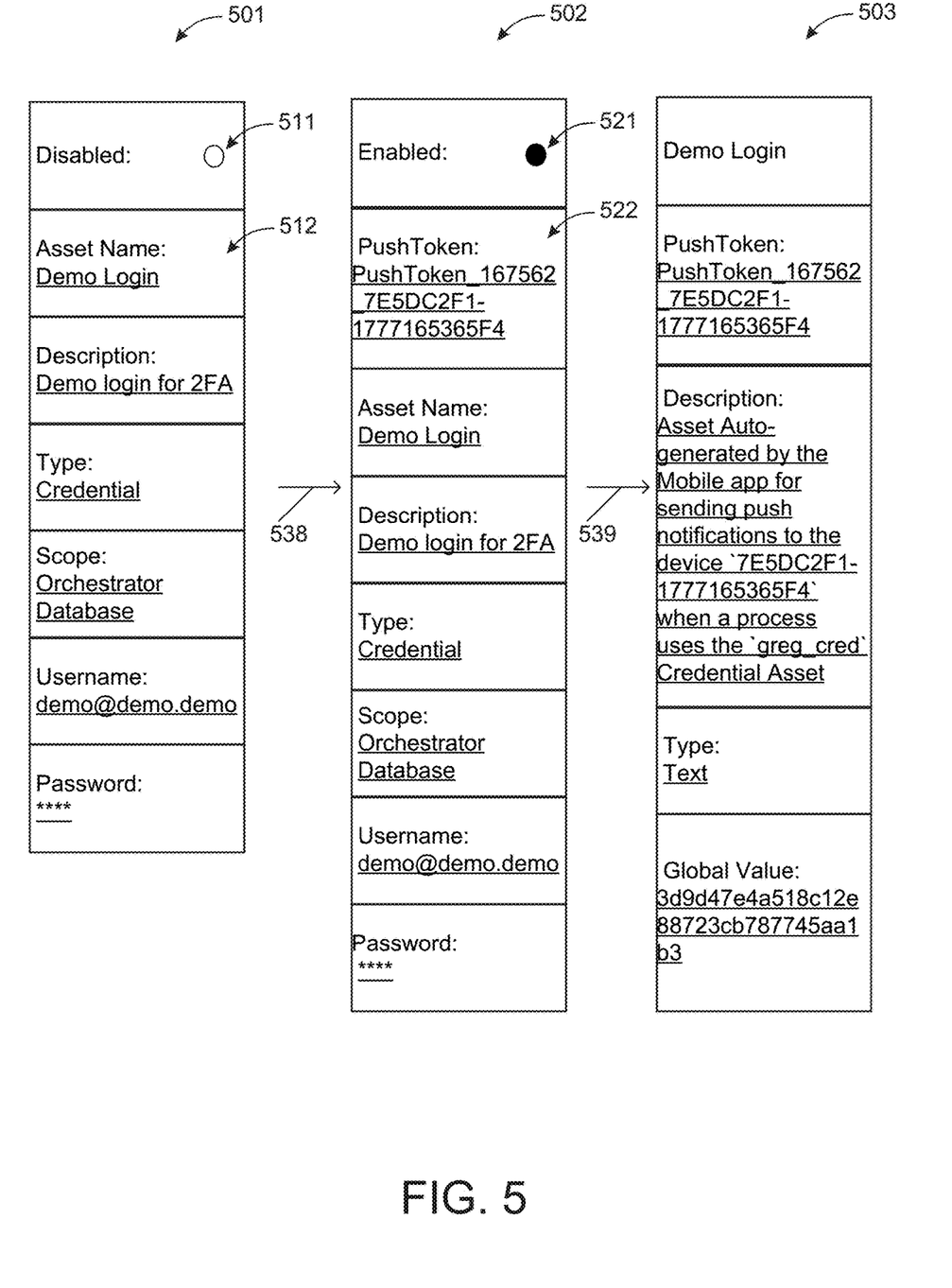
FIG. 5 is a block diagram illustrating a user interface according to one or more embodiments.

Turning to FIG. 5, creating the PushToken is described with respect to asset detail screens 501, 502, and 503, each of which includes one or more configurable cells. For instance, one cell of the asset detail screen 501 includes a toggle 511 for enabling and creating a credential asset, along with selecting a type. Others cells of the asset detail screen 501 includes a name 512, a description, a type, a scope, a username, and a password. The cells of the asset detail screen 402 can include a toggle 521, a PushToken 522, a name, a description, a type, a scope, a username, and a password, while the cells of the asset detail screen 503 include a PushToken, a name, a description, a type, a scope, and a global value.

The asset detail screen 501 can be generated/provided by the user interface and the display of the user device 305 that are executing the local application 320 (e.g., the mobile application). In accordance with one or more embodiments, the toggle 511 is only shown on the asset detail screen 501 for orchestrator instances. The toggle 511 does not show if the credential asset is a pending 2FA. When the toggle 511 is enabled, the authentication system 340 and/or the user device 305 prompts the user to register for the PushNotifications (if the user has not already registered). When the user accepts/registers and the user device 305 gets a PushToken, the local application 320 generates a 'TextAsset' with the PushToken. The name 512 of the TextAsset can include PushToken_<AssetID>_<DeviceUUID>, where AssetID is an identification of this credential asset and DeviceUUID is an identification of the user device 305. In accordance with one or more embodiments, the TextAsset can be generated/ posted according to the follow code:

```
POST 'odata/Assets'
{
    "Name": "PushToken_167562_7E5DC2F1-1777165365F4"
    "Description": "Asset Auto-generated by the Mobile app for
        sending push notifications to the device `7E5DC2F1-
        1777165365F4` when a process uses the `greg_cred`
        Credential Asset"
    "HasDefaultValue": true
    "ValueScope": "Global"
    "ValueType": "Text"
    "StringValue": "3d9d47e4a518c12e88723cb787745aa1b3"
}
```

Subsequently (see arrow 538), the asset detail screen 502 can show this PushToken 522 by fetching with respect to the name 512 (e.g., PushToken_<AssetID>_<DeviceUUID>). In accordance with one or more embodiments, the fetch operation can be performed according to the follow code:

```
GET 'odata/Assets'
{
    "$filter": "(contains(Name,'PushToken_167562_7E5DC2F1-
        1777165365F4')"
}
```

The PushToken 522 (e.g., "Auto-Generated PushToken Asset") cell can be pressed to go directly to an asset detail screen 503 of the PushToken 522. Note that the toggle 511 can also be toggled 'off' to delete the PushToken 522 and return the screen to an original state (e.g., asset detail screen 501) according to the following code:
DELETE 'odata/Assets(208428)'

Additionally, the user interface and the local application 320 also include a "QuickActions" screen where, on a 2FA tab, a top action button allows a user to view the PushToken 522 (e.g., "View your 2FA Push Token Assets"). For instance, pressing the top action button takes the user to an assets tab filtered only to show the generated PushToken 522, which is obtained by fetching Assets that include "PushToken" and the user's DeviceUUID according to the follow code:

```
GET 'odata/Assets'
{
    "$filter": "(contains(Name,'PushToken_') and
        (contains(Name,'_7E5DC2F1-1777165365F4')"
    "$top": 20
    "$skip": 0
}
```

The user interface of the local application 320 can also open asset detail views to match the credential asset 354 for the PushToken 522, as well press a '. . . ' button to delete the PushToken 522. In accordance with one or more operations, the local application 320 can execute maintenance operations. For instance, when a user logs-in to or returns to the local application 320, the local application 320 can fetch all of the PushTokens 522 and check if any of the PushTokens 522 are out of date. If any PushTokens 522 are out of date, then the local application 320 updates each credential asset 350 with the new PushToken 522 according to the following code:

```
PUT 'odata/Assets(208428)'
{
    "Id": 208428
    "Name": "PushToken_167562_7E5DC2F1-1777165365F4"
    "Description": "Asset Auto-generated by the Mobile app for
```

-continued

```
        sending push notifications to the device `7E5DC2F1-
        1777165365F4` when a process uses the
        `greg_cred` Credential Asset"
    "HasDefaultValue": true
    "ValueScope": "Global"
    "ValueType": "Text"
    "StringValue": "3d9d47e4a518c12e88723cb787745aa1b3"
    "CanBeDeleted": true
}
```

The technical effect and benefits, thus, include enabling a user to specifically select which assets will receive 2FA Push Notifications and avoiding hard coding in the authentication system due to the configurability of the credential asset and use of tokens.

At block 415, the robotic process 335 executes (starts running) the job 340. In turn, the robotic process 335 attempts to access the online platform 315 (e.g., dashed arrow B). Executing the job 340 and accessing or logging-in to the online platform 315 can be manual, by schedule, by trigger, by queue, etc. In accordance with one or more embodiment, if the job 335 is an automated process to backup emails of the online platform 315 (e.g., an email service/website), accessing the online platform can be a daily scheduled event (e.g., every evening at 11:00 PM). The robotic process 335 would further use the user credentials 345 to log-in to the email service/website. An example of user credentials 345 includes an email address as a username and a password.

At block 420, the robotic process 335 generates/creates the credential asset 354. The robotic process 335 can create the credential asset 354 with a specific set-up so that the local application 320 will recognize the credential asset 354 as part of a multi-factor authentication framework (e.g., a 2FA Code Required asset). This credential asset 354 includes all of the information that the local application 320 needs to know and display to the user.

At block 425, the robotic process 335 fetches the push token 355 for the user credential 345 used to log-in. The robotic process 335 can fetch all of the push tokens 355 by using an identification (e.g., the name 512 of FIG. 5) of the credential asset 354. For example, if the credential asset 354 has an ID of '12345', then the robotic process 335 fetches all push tokens 355 that start with the name "PushToken_12345." If there are no push tokens 355, the job 340 fails and the process flow 400 ends.

At block 430, the robotic process 335 calls a notification (e.g., a Push Notification URL) for each of the push tokens 355 fetched in block 425. For instance, the robotic process 335 calls the Push Notification URL once for each push token 355 fetched as follows:

```
--request POST
'https://orchestrator-push-relay.sites.net/2fa/dqCYHs:APAr3IzRSIR'\
--header 'Content-Type: application/json' \
--data-raw '
    {
        "assetId" : "12345",
        "tenantName" : "fantastic",
        "tenantId" : "1",
        "organizationUnitId" : "1",
        "languageCode" : "en"
    }'
```

Note that "dqCYHs:APAr3IzRSIR" is a mobile device's push token. The PushToken asset is a "Text" type, and the mobile device's push token is stored in the "StringValue" field. "languageCode" is optional, while all the other fields are required.

At dashed block 435 (dashed because it is optional), the relay server 350 is alerted to send a push notification (e.g., by the authentication engine 330 to the user device 305 view arrows C2 and C3). For instance, the URL called in block 435 hits the relay server 350 (e.g., the local application's 320 Push Notification Relay Server), which sends the push notification to the user device 305 with the associated push token 355 that was passed to the relay server 350.

At block 440, the robotic process 335 polls the credential asset 354. That is, the robotic process 335 can sit idly on the 2FA screen while polling every few seconds for the credential asset 354 created in block 420 to check if it includes the one or more codes 325. If the robotic process 335 detects that the code 325 has been set into a password field of the credential asset 354, then the robotic process 335 can enter the code 325 into the email service/website. The robotic process 335 can detect that the code 325 has been entered when a 'needsCode' property of the description JSON has been set to zero.

At block 445, the user device 305 receives the notification and the code 325 (e.g., the Push Notification/Alert and a 2FA short message service (SMS) message). That is, the user device 305 receives the push notification and receives the code 325 (e.g., the 2FA code) via SMS from the email service/website that the robotic process 335 attempted to log-into. While the user device 305 is open, the user device 305 polls for the credential asset 354 (e.g., the "2FA Code Required" assets) periodically, such as every 30 seconds, to check for any pending requests. If the user device 305 finds any pending requests, the user device 305 produces an alert in the local application 320. In some cases, the user interface of the local application 320 can be updated to include any pending "2FA Code Required" assets. When a user taps on the Push Notification or in-app alert, and the 'needsCode' property of the description JSON of the Asset is set to 1, the process flow 400 proceeds to block 450 so the user can enter the code 325.

At block 450, the local application 320 presents a screen of the user interface that can receive the code 325. For instance, the local application 320 shows a "Send Code" modal screen where a user can enter the 2FA code received via SMS on the user device 305. The credential asset 354 is then updated by the local application 320 to include the code 325 in the password field, and the 'needsCode' property of the description JSON is set to zero.

At block 455, the robotic process 335 retrieves the code 325 (since the credential asset 354 was updated), as the robotic process 335 has polling (as described in block 440). At block 460, the robotic process 335 deletes the credential asset 354, regardless of whether or not the robotic process 335 succeeds in getting and entering the 2FA code. At block 465, the robotic process 335 continues execution of the job 340.

In view of the disclosure herein, the technical effects and benefits of the context-aware undo-redo service include preventing snooping by non-authorized users and enabling robotic process to proceed with accessing online platforms with multi-factor authentication.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a memory configured to store processor executable instructions for an authentication system; and
at least one processor coupled to the memory,
wherein the at least one processor is configured to execute the authentication system to cause the computing device to:
generate, by the authentication system, a credential asset comprising a digital-based proof of identification that includes a unique name of a robotic process;
fetch, by the authentication system, one or more tokens for the credential asset using the unique name, the one or more tokens comprising at least a push token that enables selection and association of the credential asset and enables receipt of a push notification requesting two-factor codes for the credential asset;
call, by the authentication system, one or more notifications including the push notification that corresponds to the push token;
poll, by the authentication system, for a code of the credential asset; and
utilize, by the authentication system, the code for an authentication between an online platform and the robotic process to run a job executed by the robotic process that accesses the online platform and utilize, by the authentication system from a user device, the code in response to the one or more notifications to update the credential asset,
wherein the push notification is sent to the user device when the robot process encounters multi-factor authentication.

2. The computing device of claim 1, wherein the credential asset is generated in response to the robotic process of the at least one processor executing the job requiring the authentication.

3. The computing device of claim 1, wherein the push token comprises a unique key, access handle, or system object representing access control operations,
wherein a security token of the one or more tokens comprises at least one cryptographic tokens, and
wherein a session token of the one or more tokens comprises at least one a unique identifier of an interaction session.

4. The computing device of claim 1, wherein the push notification comprises a push notification uniform resource locator.

5. The computing device of claim 1, wherein the push notification causes a relay server in communication with the computing device and the user device to provide the one or more tokens to the user device.

6. The computing device of claim 1, wherein the code is received and utilized by the authentication system to update the credential asset in response to the one or more notifications.

7. The computing device of claim 1, wherein the credential asset saves data so that a local application of the user device and the robotic process communicate information.

8. The computing device of claim 1, wherein the credential asset is deleted by the robotic process of the at least one processor executing the job requiring the authentication.

9. The computing device of claim 1, wherein a robotic process of the authentication system polls the credential asset for the code.

10. The computing device of claim 1, wherein the digital-based proof of identification of the credential asset includes a description field, the unique name, and a password field that collectively identify qualification, competence, or clearance for an associated user or device.

11. The computing device of claim 1, wherein the digital-based proof of identification of the credential asset provides the unique name and at least one of birth information, manufacturing information, identification information, and biometric information for an associated user or device.

12. The computing device of claim 1, wherein the calling for the one or more notifications is made to the user device and causes the user device to display the one or more notifications.

13. The computing device of claim 1, wherein the authentication system updates the credential asset in response to the push notification receiving the code.

14. A method comprising:
generating, by an authentication system comprising a memory and at least one possessor coupled to the memory, a credential asset comprising a digital-based proof of identification that includes a unique name of a robotic process;
fetching, by the authentication system, one or more tokens for the credential asset using the unique name, the one or more tokens comprising at least a push token that enables selection and association of the credential asset and enables receipt of a push notification requesting two-factor codes for the credential asset;
calling, by the authentication system, one or more notifications including the push notification that corresponds to the push token
polling, by the authentication system, for a code of the credential asset; and
utilizing, by the authentication system, the code for an authentication between an online platform and the robotic process to run a job executed by the robotic process that accesses the online platform and utilize, by the authentication system from a user device, the code in response to the one or more notifications to update the credential asset,
wherein the push notification is sent to the user device when the robot process encounters multi-factor authentication.

15. The method of claim 14, wherein the credential asset is generated in response to the robotic process of the at least one processor executing the job requiring the authentication.

16. The method of claim 14, wherein the push token comprises a unique key, access handle, or system object representing access control operations,
wherein a security token of the one or more tokens comprises at least one cryptographic tokens, and
wherein a session token of the one or more tokens comprises at least one a unique identifier of an interaction session.

17. The method of claim 14, wherein the push notification comprises a push notification uniform resource locator.

18. The method of claim 14, the push notification causes a relay server in communication with a computing device and the user device to provide the one or more tokens to the user device.

* * * * *